(No Model.)  2 Sheets—Sheet 1.

M. W. LONG.
MECHANICAL MOVEMENT.

No. 366,331. Patented July 12, 1887.

NORMAL

ACTING

Attest.
Sidney P. Hollingsworth
Wm. L. Kennedy

Inventor.
M. W. Long
By his Atty.
P. T. Dodge

N. PETERS, Photo-Lithographer, Washington, D. C.

(No Model.) 2 Sheets—Sheet 2.
M. W. LONG.
MECHANICAL MOVEMENT.
No. 366,331. Patented July 12, 1887.
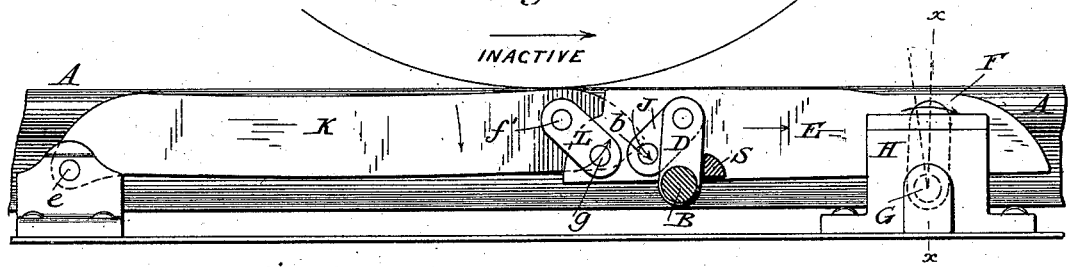
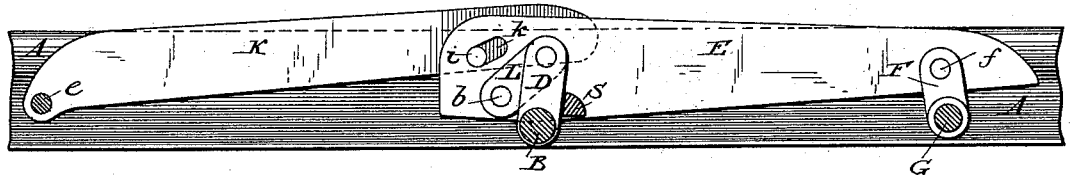
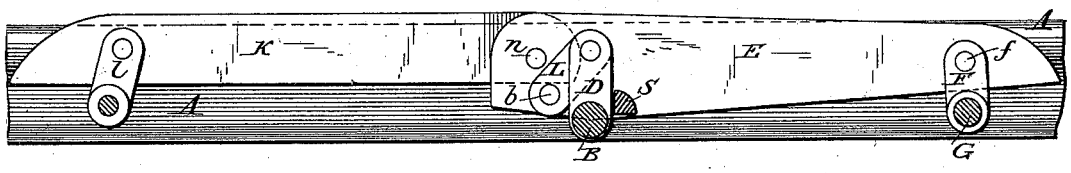
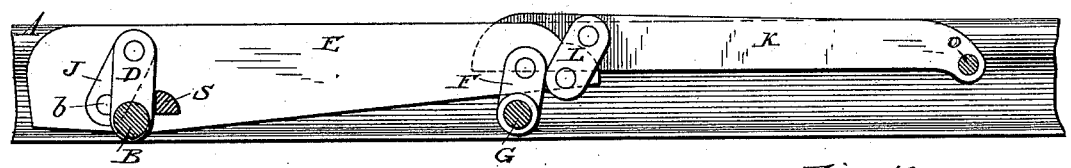
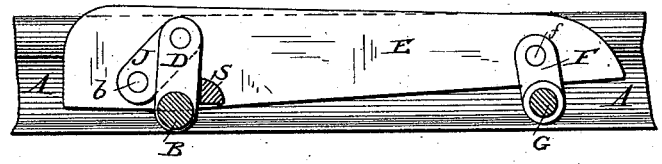
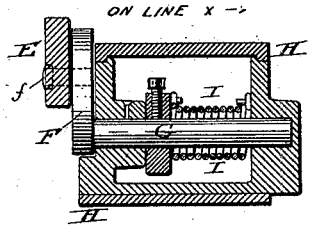
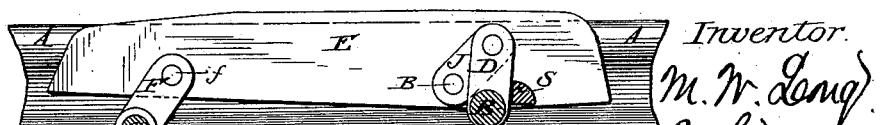
Attest
Sidney P. Hollingsworth
Wm. L. Kennedy
Inventor.
M. W. Long
By his Atty
O. T. Dodge

UNITED STATES PATENT OFFICE.

MALCOLM WALLACE LONG, OF HARRISBURG, PENNSYLVANIA.

MECHANICAL MOVEMENT.

SPECIFICATION forming part of Letters Patent No. 366,331, dated July 12, 1887.

Application filed May 26, 1886. Serial No. 203,317. (No model.)

*To all whom it may concern:*

Be it known that I, MALCOLM WALLACE LONG, of Harrisburg, in the county of Dauphin and State of Pennsylvania, have invented certain Improvements in Mechanical Movements, of which the following is a specification.

My invention has reference to that class of devices commonly known as "track-levers," which are used adjacent to railway-tracks to be operated by the wheels of passing railway-trains for the purpose of imparting motion to signals, magneto-generators, or other devices or mechanisms.

The principal aims of the invention are to provide a device which may be operated smoothly and gradually by trains running at high speed, which shall be free from liability under all circumstances to derail the train, and which, in certain of its forms, shall be adapted to impart motion to the generator or other device connected thereto during the movement of trains in one direction thereover, but not during their movement in the opposite direction.

In the accompanying drawings I have represented my invention embodied in various forms, the mechanical equivalents of each other.

Figure 1:
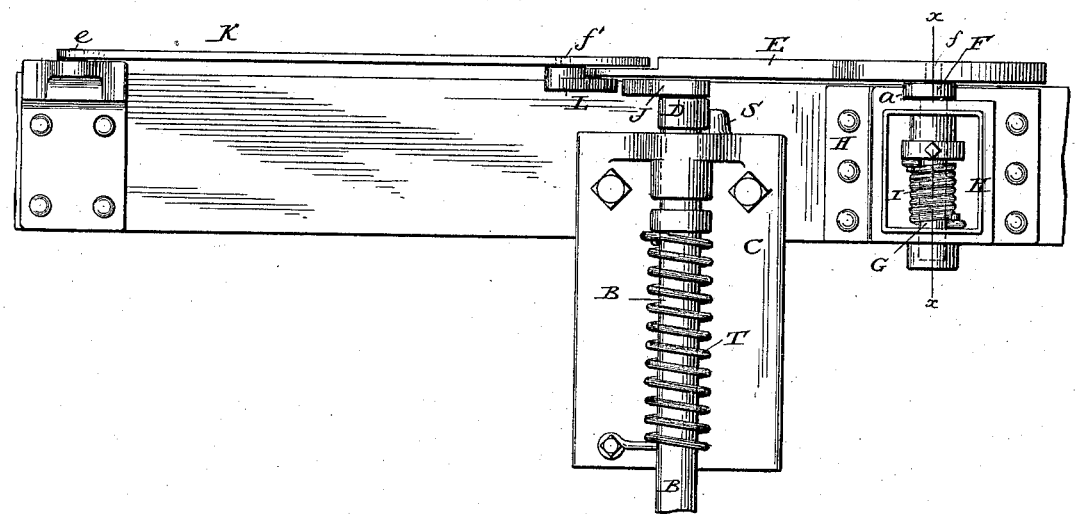
Figure 2:
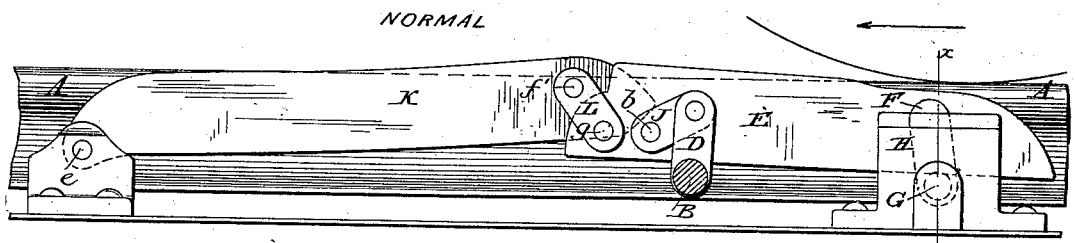
Figure 3:
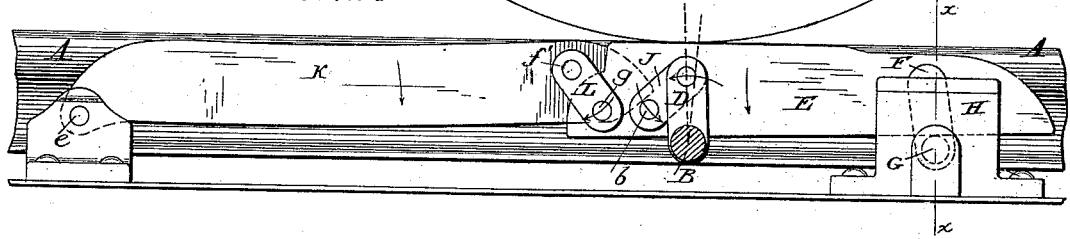

Referring to the drawings, Figure 1 represents a top plan view of the device in its approved form. Figs. 2, 3, and 4 are side elevations of the same with its parts in the various positions which they assume under different conditions. Figs. 5, 6, 7, 8, and 9 are side elevations of the device in various modified forms. Fig. 10 is a cross-section on the line *x* *x* of Figs. 1, 2, &c., showing the sustaining-link and the spring-box, which may be used in connection with the device in its several forms.

Referring to Figs. 1 to 4, A represents the railway-rail; B, an adjacent rock-shaft to which it is required to impart motion, this shaft being arranged horizontally in a suitable bearing or support, C, at right angles to the rail, and provided adjacent to the rail with a crank-arm, D, fixed rigidly thereto. A stop, S, of the form shown, or of any equivalent form or arrangement, is used to prevent the crank from moving to right of its normal position, and a spring, T, encircling the shaft, as shown, or otherwise applied, tends to hold the crank in its normal position against the stop.

E represents a vertical plate lying adjacent to the outer edge of the rail, and extending lengthwise thereof. At one end, distant from the rock-shaft, this plate is carried by the wrist *f* of a crank, F, secured to the end of a horizontal rock shaft, G, mounted in a box or bearing, H, and encircled by a spiral spring, I, the latter having one end fixed to a collar on the shaft and the opposite end fixed to a stud or projection on the bearing-edge. This spring maintains the crank F normally, as shown in Figs. 1, 2, and 3, with an upward inclination toward the crank D against a stop-shoulder, *a*, formed on the box H, but permits the arm to swing toward the right or away from the shoulder under conditions which will be presently explained. At the end adjacent to the rock-shaft the plate E is pivoted at *b* to link J, which extends thence upward toward the right to the wrist of the crank D of the rock shaft.

K represents a second plate or arm lying parallel with the rail, one end pivoted at *e* to a stationary block, and the opposite end pivoted at *f'* to the upper end of a link, L, which stands in an oblique position, and is connected at its lower end by a pivot, *g*, to the plate E, before described. In their normal condition the various parts stand in the position represented in Fig. 2, the upper edges of the plates E and K extending at their outer or distant edges flush with or below the top of the rail, and rising thence toward their inner ends, where they stand above the rail, as plainly shown.

When a car-wheel passes over the track toward the left, as indicated in Fig. 3, it will ride over the top of plate E and depress the same, and as the inclination of crank F prevents it from swinging to the right the plate will swing about the wrist of the crank as a center, and in sinking will cause the link J to pull the crank to the left, thereby imparting a rocking motion to the shaft B. The movement of the several parts at this time is indicated by the dotted lines in Fig. 3. As the wheel continues its onward course, it rides over the plate E to the plate K, and in passing over the latter permits it to rise gradually, so that the parts resume their original positions without sudden shock or reaction.

If, instead of moving to the left, as above described, a train passes over the track to the right, as indicated by the arrow in Fig. 4, the wheel will first depress the plate K, which, through the link L, and owing to the oblique position of the latter, will push the plate E downward and to the right, the link J swinging at this time downward around the wrist of the crank D as a center, and the spring I yielding and permitting the crank F to rock to the right, so that the plate E sinks without imparting motion to the crank D.

From the foregoing it will be observed that trains moving to the left operate the shaft B, while trains moving to the right permit the shaft to remain at rest.

The apparatus represented in Fig. 5 differs from the foregoing only in that the link L is omitted, and the two plates E and K connected by means of a stud, $i$, fixed to the plate K, and entering an inclined slot, $k$, in the plate E. The spring and stop are used in connection with the crank F in the same manner as in the preceding form of the apparatus. Wheels passing to the left communicate motion to the parts, as in the first-described apparatus. Wheels passing to the right depress the plate K, which through the stud forces the plate E downward and to the right, the plate swinging upon link L and crank F to the right without operating crank D.

The construction shown in Fig. 6 differs from the first in that the plates E and K are pivoted directly together at $n$, and the plate K supported at its outer instead of its inner end by the inclined swinging link L, mounted on a fixed pivot at its lower end, or by an equivalent crank having a like pivotal motion. Wheels moving to the left depress the plate E and operate the crank D, as in both the preceding devices. When wheels pass to the right, the weight first comes over the inclined link L, depressing its free end, so that it gives an endwise motion to the plates K and E as they sink, the link L swinging meanwhile on the wrist of the crank D, which is permitted to remain at rest.

Under the construction represented in Fig. 7 the plates E and K are connected by the link L, having an inclined position, as shown. The plate K is supported at its outer or distant end by a fixed pivot, $o$, and the plate E supported at its outer end on a link, J, supported by a crank, D, on a rock-shaft, B.

In the normal position the edge of the plate E is level with the top of the rail or below it, the inner end of plate K extending slightly below the top of the rail. In this form of device the spiral spring I is arranged to urge the crank F toward the right instead of the left, as in the first example. A wheel passing the plate K to the left causes the link L, by reason of its oblique position, to shift the plate E endwise toward the left, and the latter in turn pulls the crank F to the left past the center, and swinging the link J on the wrist of crank D, causing the outer end of plate E to rise above the top of the rail. When the wheel rolls off plate K onto plate E, as the crank F is inclined beyond the center, the weight of the wheel prevents endwise movement of plate E, whereupon the depression of its outer end pulls crank D to the left and operates the rock-shaft in the same manner as in the first form of apparatus. As the wheel travels to the right, the plate E, being in its normal position depressed, is not affected until the wheel reaches the plate K, when, by the depression of the latter, the outer end of the plate E is elevated until, the wheel passing off from plate K, the spring attached to crank F causes the parts to resume their normal positions, the crank D and its rock-shaft remaining at rest.

In each of the above devices it will be observed that there are two plates connected with each other, one of the plates maintained by swinging supports, so that it may move endwise and sink, and the plate which is movable endwise connected by a swinging link to the crank of the shaft to be operated, the several arrangements, although differing in form, involving the same principle.

In Fig. 8 E represents a plate rising from one end above the track, one end being supported by a crank, F, combined with a spring and a stop-shoulder, as in Figs. 1 and 10. At its opposite end this plate is connected as in Figs. 1 to 4, by the swinging link J to the crank D of the rock-shaft. Trains moving to the left will cause the operation of the rock-shaft. This device, which is intended for double-track roads, or roads over which the trains travel in one direction only, is identical with that shown in Figs. 1 to 4, except that the plate K is omitted.

In the form of apparatus shown in Fig. 9 the plate E, rising at its middle above the track and inclined downward toward its two ends, is supported at one end on an inclined crank, F, the shaft of which will be combined with a spring and a stop to limit its upward motion. At its right end the plate is sustained by an oblique pivot, J, from the wrist of an upright crank, D, attached to the rock-shaft B. Trains moving to the left will depress the plate and cause it, through the link J, to pull the crank D to the left. Trains moving to the right will urge the plate downward and to the right, this movement occurring upon the crank F and link J without moving the crank D.

In order that the inertia of the parts may be overcome easily or without violent action, I prefer to construct the lever in each case with its upper edge curved downward or inward longitudinally; or, in other words, to make it of a concave form, as plainly represented in Figs. 2, 3, and 4. The wheel riding upon this surface will start the plate with a gradual and easy action and with less tendency to batter and injure the surface than would otherwise exist.

In each of the several arrangements represented the spring and stop may be used in connection with the rock-shaft B, in the manner shown in Fig. 1; or they may be replaced by devices in any equivalent form.

It will be understood that the purpose of the invention is to impart motion to the rock-shaft B, or its equivalent, and that the motion thus obtained from the car-wheels may be applied to mechanism of any suitable character for any desired purpose, such as the operation of magneto-generators, the adjusting of mechanical signals, or the controlling of electric circuits through which signals are controlled or operated.

While I have particularly described my apparatus as being applied adjacent to a car-track to be operated by the wheels, it will be understood that it may be operated by contact with any suitable portion of the passing trains or devices applied thereto.

While I prefer to employ the spiral spring and rock shaft to sustain the plates in the form shown, it is to be understood that the device may be applied in any equivalent form and manner, the only requirement being that it shall tend to sustain the crank or link to which it is applied in its normal position.

It is also to be understood that while I prefer to maintain the track-plate by a swinging support in the form of a pivotal arm link or crank any equivalent device familiar to the mechanic which will cause the plate to move endwise in one direction only as it sinks may be substituted.

Having thus described my invention, what I claim is—

1. In a track-connection, a plate lying parallel with and rising above the track-rail, supporting devices, substantially as described, to move the plate endwise in one direction only as it sinks, a lifting-spring, and a crank connected with the plate by a link, said members constructed and combined for joint operation, substantially as described.

2. In a track-connection, an inclined plate, swinging supports allowing said plates to sink with an end motion in one direction only, a rock-shaft connected with and receiving motion from one of said supports, and a spring tending to hold said parts in their normal position with the plate elevated.

3. In a track-connection, the combination of a crank, to be operated by passing trains, with a plate movable vertically with an end motion in one direction only as it sinks and a connecting-link, inclined substantially as described and shown.

4. The plate E, its supporting-crank F, and the stop and spring acting in connection with said crank, in combination with the plate K, mounted in a fixed pivot and jointed to plate E, the rock-shaft B, and its crank D, and the connecting-link.

5. The shaft B, its crank D, the stop limiting the motion of said crank in one direction, and the spring urging the crank toward said stop, in combination with a second crank, F, a stop and a spring acting in connection therewith, and a track-plate, E, connected directly to one of said cranks, and an intermediate link connecting said plate with the other crank, substantially as described and shown.

6. The track-lever, the crank sustaining the same and the horizontal rock-shaft secured to the crank, in combination with the box or housing through which the shaft passes, provided with a stop-shoulder to limit the motion of the crank, and the spring inclosed within the box and attached thereto and to the shaft, as described.

In testimony whereof I hereunto set my hand, this 15th day of May, 1886, in the presence of two attesting witnesses.

MALCOLM WALLACE LONG.

Witnesses:
S. W. FLEMING,
GEO. W. PARSONS.